US012241290B2

(12) United States Patent
Toyama

(10) Patent No.: US 12,241,290 B2
(45) Date of Patent: Mar. 4, 2025

(54) HANDLE DEVICE FOR VEHICLE

(71) Applicant: ALPHA CORPORATION, Kanagawa (JP)

(72) Inventor: Takao Toyama, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 330 days.

(21) Appl. No.: 17/654,207

(22) Filed: Mar. 9, 2022

(65) Prior Publication Data

US 2022/0195762 A1 Jun. 23, 2022

Related U.S. Application Data

(63) Continuation of application No. PCT/JP2020/030013, filed on Aug. 5, 2020.

(30) Foreign Application Priority Data

Sep. 11, 2019 (JP) ................................ 2019-165088

(51) Int. Cl.
*E05B 77/06* (2014.01)
*E05B 85/10* (2014.01)
*E05B 85/16* (2014.01)

(52) U.S. Cl.
CPC ............ *E05B 85/103* (2013.01); *E05B 77/06* (2013.01); *E05B 85/107* (2013.01); *E05B 85/16* (2013.01); *E05Y 2900/531* (2013.01)

(58) Field of Classification Search
CPC ...... E05B 85/10; E05B 85/103; E05B 85/107; E05B 85/16; E05B 77/06; Y10S 292/22
See application file for complete search history.

(56) References Cited

U.S. PATENT DOCUMENTS 5,123,687 A * 6/1992 Pfeiffer ................. E05B 1/0092 292/DIG. 31
6,719,336 B2 * 4/2004 Sato ........................ E05B 79/06 292/336.3

(Continued)

FOREIGN PATENT DOCUMENTS

CN 107503598 A * 12/2017 ............. E05B 79/06
CN 108331473 A * 7/2018 ............. E05B 85/00

(Continued)

OTHER PUBLICATIONS

The extended European search report issued by the European Patent Office on Aug. 30, 2023, which corresponds to European Patent Application No. 20864017.7-1005 and is related to U.S. Appl. No. 17/654,207.

(Continued)

*Primary Examiner* — Carlos Lugo
(74) *Attorney, Agent, or Firm* — Studebaker & Brackett PC

(57) ABSTRACT

A handle device for a vehicle includes a handle body, a latch release lever, a door latch device, an electric actuator and a lever push member. The handle body is driven from an initial position to a pop-up position by the electric actuator and is manually operated to a latch operation position. A latch of the door latch device is released by the latch release lever being driven to a latch release position. The lever push member rotates from an initial corresponding position and pushes the latch release lever toward the latch release position with an operation of the handle body. The lever push member is set with a moment of inertia to cancel an inertia force generated when a collision impact load is applied to the vehicle and to move the lever push member toward the latch release position.

5 Claims, 11 Drawing Sheets

(56) References Cited

U.S. PATENT DOCUMENTS

| | | | | |
|---|---|---|---|---|
| 7,070,216 | B2 * | 7/2006 | von zur Muehlen | E05B 77/06 70/92 |
| 7,204,530 | B2 * | 4/2007 | Lee | E05B 85/12 292/336.3 |
| 7,303,217 | B2 * | 12/2007 | Savant | E05B 77/06 292/336.3 |
| 7,407,203 | B2 * | 8/2008 | Huizenga | E05B 79/20 292/347 |
| 9,033,396 | B2 * | 5/2015 | Nam | E05B 77/06 292/336.3 |
| 9,605,452 | B2 * | 3/2017 | Yoshino | E05B 85/107 |
| 11,499,352 | B2 * | 11/2022 | Guerin | E05B 85/107 |
| 11,643,855 | B2 * | 5/2023 | Och | E05B 77/06 292/336.3 |
| 11,680,432 | B2 * | 6/2023 | Sobecki | E05B 85/103 292/336.3 |
| 2011/0163554 | A1 * | 7/2011 | Patel | E05B 77/06 292/216 |
| 2015/0061304 | A1 | 3/2015 | Ichikawa et al. | |
| 2016/0273247 | A1 | 9/2016 | Fujiwara | |
| 2019/0234122 | A1 * | 8/2019 | Löw | E05B 85/103 |
| 2020/0087956 | A1 | 3/2020 | Guerin | |

FOREIGN PATENT DOCUMENTS

| | | | | | |
|---|---|---|---|---|---|
| CN | 108979368 | A | * | 12/2018 | E05B 77/06 |
| EP | 3 396 088 | A1 | | 10/2018 | |
| JP | 2008-156936 | A | | 7/2008 | |
| JP | 2011-256654 | A | | 12/2011 | |
| JP | 2015-090028 | A | | 5/2015 | |
| JP | 2019-044485 | A | | 3/2019 | |
| KR | 20050047984 | A | * | 5/2005 | |
| KR | 20190072303 | A | * | 6/2019 | |
| WO | 2008/129003 | A2 | | 10/2008 | |
| WO | 2013/153947 | A1 | | 10/2013 | |
| WO | 2018/210903 | A1 | | 11/2018 | |

OTHER PUBLICATIONS

International Search Report issued in PCT/JP2020/030013; mailed Sep. 1, 2020.

* cited by examiner

HANDLE DEVICE FOR VEHICLE

CROSS-REFERENCE TO RELATED APPLICATIONS

The present application is a continuation application of PCT/JP2020/030013 that claims priority to Japanese Patent Application No. 2019-165088 filed on Sep. 11, 2019, the entire content of which is incorporated herein by reference.

TECHNICAL FIELD

The presently disclosed subject matter relates to a handle device for a vehicle.

BACKGROUND

Patent Literature 1 discloses a handle device having a flash surface specification, which is accommodated in a recess formed in a vehicle door or the like when not in use and is moved to a projecting position by an electric actuator when in use.

The handle device of Patent Literature 1 includes an outer handle (handle body) that is rotatable about a rotation axis, a handle lever that is rotatable about a predetermined rotation axis and includes a link hole into which a linking protrusion formed in the handle body is fitted, and a drive lever that is rotationally driven by an electric motor.

When the electric motor is driven when the handle body is held at an initial portion when not in use, the drive lever rotates, and an abutment pin is pushed against a pin provided on the drive lever to rotate the handle lever, whereby the handle body moves from the initial position to a pop-up position.

When the handle body is further rotated from the pop-up position, a release lever rotates in accordance with rotation of the drive lever, and a latch release operation of a latch mechanism connected to the release lever is performed.

An inertia lever is rotatably connected to a support case to which the handle body is attached. When an impact due to a collision is applied, the inertia lever rotates to a restriction position and restricts an operation of the handle body at the initial position to prevent an inadvertent release operation of a door lock and an accompanying opening operation of a door.

Patent Literature 1: JP2015-090028A

In the handle device for a vehicle in Patent Literature 1, the inertia lever can only restrict the operation of the handle body only when the handle body is at the initial position and cannot restrict movement of the handle body in a pop-up posture at the time of collision, and thus the inertia lever cannot prevent the opening operation of the door.

SUMMARY

According to an embodiment of the presently disclosed subject matter, in a handle device for a vehicle, it is possible to reliably prevent a door from opening due to a collision impact regardless of whether a handle body is at an initial position or a pop-up position.

According to the embodiment of the presently disclosed subject matter, the handle device for a vehicle includes a handle body 2, a latch release lever 3, a door latch device 4 configured to be provided in a door of the vehicle, an electric actuator 1, and a lever push member 6. The handle body is configured to be driven from an initial position to a pop-up position by the electric actuator and is manually operated further to a latch operation position beyond the pop-up position, and the door latch device 4 is configured such that a latch of the door latch device 4 is released by the latch release lever rotating to a latch release position. The lever push member is configured to rotate from an initial corresponding position and to push the latch release lever toward the latch release position in accordance with an operation of the handle body, the initial corresponding position corresponding to the initial position of the handle body. The lever push member is set with a moment of inertia to cancel an inertia force generated when a collision impact load is applied to the vehicle and to move the lever push member toward the latch release position.

When the handle body 2 having been driven to the pop-up position by the electric actuator 1 is further operated to the latch operation position, the lever push member 6 rotates from the initial corresponding position corresponding to the initial position of the handle body 2 to a latch release operation position.

The latch release lever 3 moves to the latch release position in accordance with movement of the lever push member 6 to the latch release operation position, and operates the door latch device 4.

When an impact force due to a side collision or the like is applied when the handle body 2 is at the initial position or the pop-up position, an inertia force for moving the handle body 2 to the latch operation position is generated in the handle body 2, and accordingly, a rotational force in a direction toward a latch operation corresponding position is generated in the lever push member 6.

In the presently disclosed subject matter in which the moment of inertia for rotating the lever push member 6 in a direction opposite to a pushing direction of the latch release lever 3 is set to the lever push member 6, even when an impact due to a collision is applied, an inertia force generated by the impact on the lever push member 6 is canceled by the moment of inertia set to the lever push member 6 itself, so that the latch release lever 3 is not operated, and inadvertent opening of the door is prevented.

As long as the lever push member 6 can move from the initial corresponding position to the latch operation corresponding position in accordance with the operation of the handle body 2, the lever push member 6 can be formed integrally with the handle body 2 or can be formed into an appropriate configuration link within an appropriate link mechanism including the handle body 2.

The handle device for a vehicle may further include a handle base 7, a drive arm 8, and an operation arm 5. The drive arm 8 may be configured such that one end of the drive arm 8 is rotatably connected to one end of the handle body, the other end of the drive arm 8 is rotatably connected to the handle base 7, and the drive arm 8 is driven by the electric actuator. The operation arm 5 may form a link mechanism together with the handle body 2 and the drive arm 8. One end of the lever push member 6 may be connected to the other end of the handle body 2, and the other end of the lever push member 6 may be rotatably connected to the handle base 7, and the lever push member 6 may be integrally formed with the operation arm 5.

In this aspect, when the drive arm 8 is rotationally driven by the electric actuator 1 such as a motor, the handle body 2, which is connected to the operation arm 5 at one end and the drive arm 8 at the other end and forms the link mechanism as a whole, moves from the initial position to the pop-up position. Thereafter, when the handle body 2 is further operated and moved to the latch operation position, the lever push member 6 fixed to the operation arm 5 is moved to the latch operation corresponding position, the latch release lever 3 is driven, and the door latch device 4 is operated.

The link mechanism can be configured as a four-joint link mechanism by the handle base 7, the drive arm 8, the operation arm 5, and the handle body 2, and in this case, a latch release operation of the door latch device 4 can be performed by manually pulling out the handle body 2, which has been driven to the pop-up position by the electric actuator 1, to the latch operation position.

When the four-joint link mechanism is configured as a parallel link mechanism, the handle body 2 moves in parallel from the initial position, and thus usability is improved.

In the handle device for a vehicle, a connection portion between the operation arm 5 and the handle body 2 may have a sliding pair. The handle body 2 may be configured to move from the pop-up position to the latch operation position by a rotation operation of the handle body 2 about a rotation center of the handle body 2 with respect to the drive arm 8.

The handle device for a vehicle may further include an inertia stopper 9. The inertia stopper 9 may be configured to, when a collision impact load is applied, rotate to a stop position and prevent the lever push member 6 from pushing the latch release lever toward the latch release position.

In this aspect, the inertia stopper 9 is formed so as to have a moment of inertia for rotating the inertia stopper 9 to the stop position by an inertia force when a collision impact is applied, and at the stop position, the inertia stopper 9 blocks a movement path of the lever push member 6 to the latch operation corresponding position and restricts movement of the lever push member in the direction.

Therefore, when the collision impact load is applied, the movement of the lever push member 6 in the direction toward the latch operation corresponding position is restricted, and thus the latch release lever 3 does not operate.

The inertia stopper 9 can be disposed at either of positions at which the movement of the handle body 2 from the initial position to the pop-up position is restricted or at which the movement of the handle body 2 from the pop-up position to the latch operation position is restricted. However, in consideration of the likelihood of collision, it is desirable to dispose the inertia stopper 9 at the position at which the movement of the handle body 2 from the initial position to the pop-up position is restricted.

The lever push member 6 may have a restriction wall 10. The restriction wall 10 may prevent the latch release lever 3 from moving to the latch release position when the handle body 2 is located at a position between the initial position and the pop-up position, and allows the latch release lever to move to the latch release position when the handle body is located at the latch operation position.

In this aspect, even when an impact force due to a collision is applied and an operation force in a direction toward the latch release position is generated due to inertia in the latch release lever 3, the movement of the latch release lever 3 in the direction is restricted by the restriction wall 10 provided in the lever push member 6, and thus the door latch device 4 is not operated inadvertently.

According to the embodiment of the presently disclosed subject matter, it is possible to reliably prevent a door from opening due to a collision impact regardless of whether the handle body is at the initial position or the pop-up position.

DESCRIPTION OF EMBODIMENTS

A door handle device includes a handle base 7, a handle body 2, a drive arm 8 connecting the handle body 2 to the handle base 7, and an operation arm 5, and is to be fixed to a door of a vehicle at the handle base 7.

Figure 1:
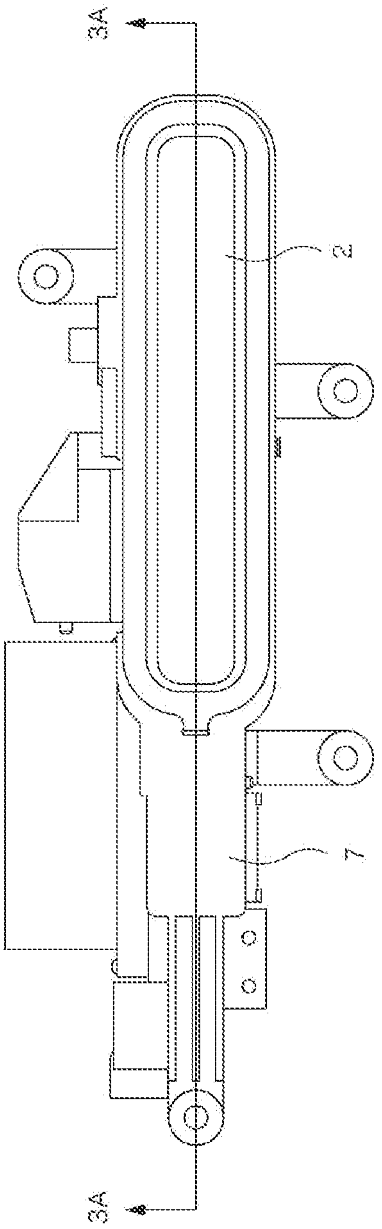
FIG. 1 is a front view of a handle device.
Figure 3:
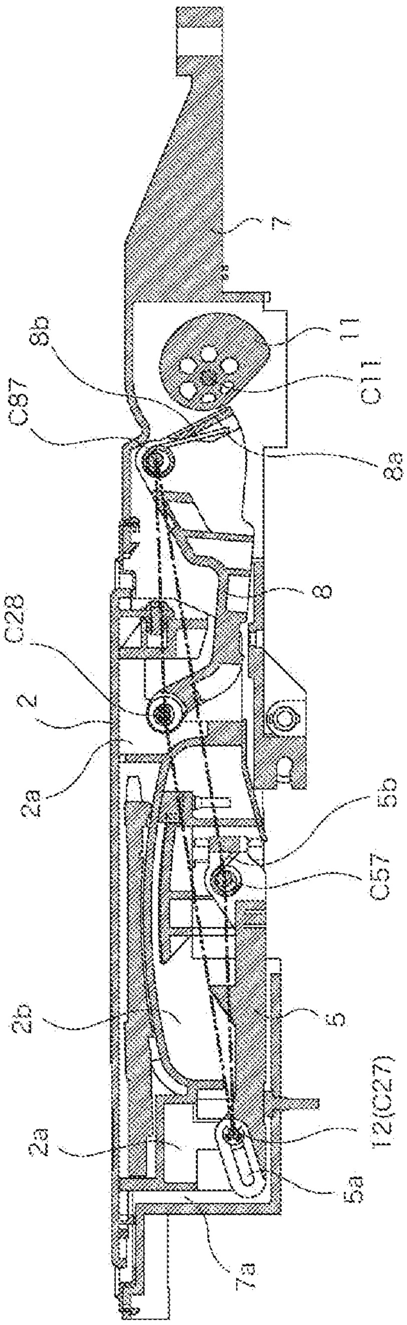
FIG. 3 is a cross-sectional view taken along a line 3A-3A of FIG. 1.
Figure 6A:
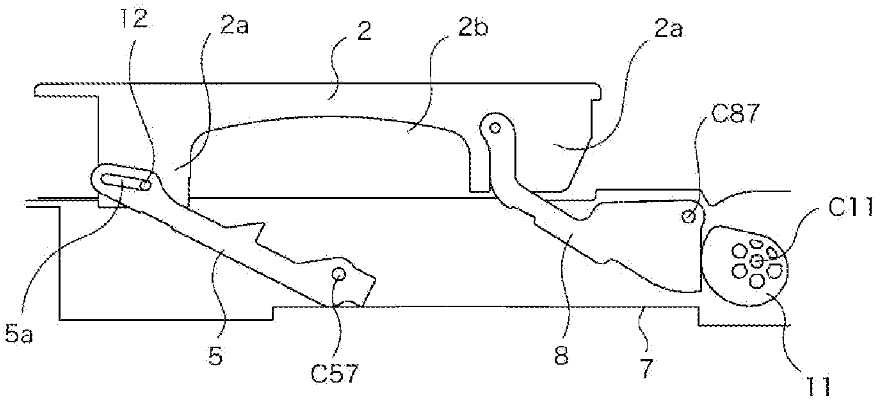
FIG. 6A shows a pop-up position of a handle body in an operation of a handle.
Figure 6B:
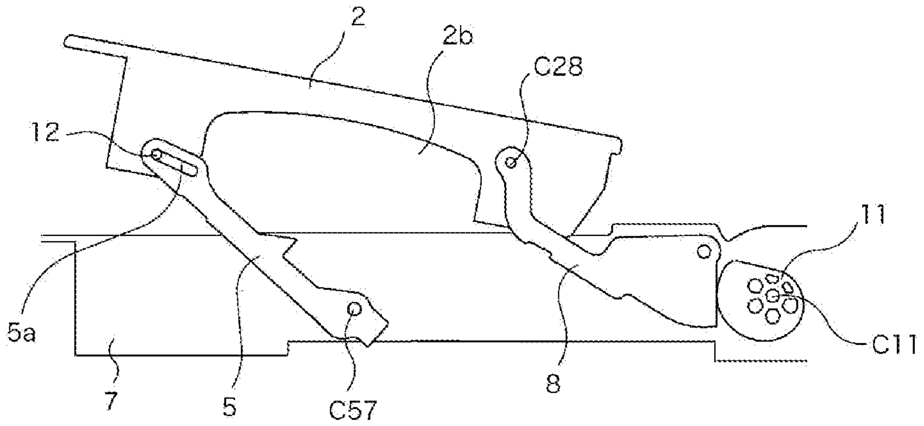
FIG. 6B shows a latch operation position in the operation of the handle.

With the handle base 7 fixed to the door, the handle body 2 can be moved from an initial position shown in FIGS. 1 and 3 to a pop-up position shown in FIG. 6A and further to a latch operation position at which one end of the handle body 2 is pulled up from the pop-up position as shown in FIG. 6B.

The door handle device has a flush surface specification in which the handle body 2 is accommodated in the door and a surface of the handle body 2 is substantially in the same plane as a door surface when not in use. The initial position of the handle body 2 corresponds to a non-use posture. The handle base 7 is formed with a handle accommodating recess 7*a* to accommodate the handle body 2 when the handle body 2 is at the initial position (see FIG. 3).

As shown in FIG. 3, the drive arm 8 and the operation arm 5 are connected to the handle base 7 so as to be rotatable about rotation centers. Rotation centers C87 and C57 of the drive arm 8 and the operation arm 5 with respect to the handle base 7 are appropriately spaced apart from each other in a front-rear direction, that is, in a longitudinal direction of the handle base 7, and the rotation center C87 of the drive arm 8 is disposed in front of the rotation center C57 of the operation arm 5.

In this description, a left side of FIG. 1 is referred to as "front", a right side is referred to as "rear", a direction directed out of the page of FIG. 1 is referred to as a "front surface" direction, and an opposite direction thereof is referred to a "back surface" direction.

Figure 4A:
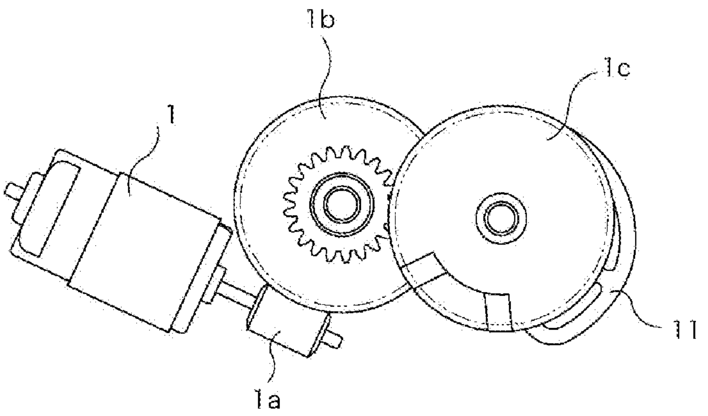
FIG. 4A shows power transmission of an electric actuator in a drive source of a drive arm.

An electric actuator 1 such as a motor is to be fixed to the handle base 7, and as shown in FIG. 4A, power of the motor 1 is transmitted to a cam 11 rotatably connected to the handle base via a worm 1*a*, a worm wheel 1*b*, and a reduction gear 1*c*.

A pressed portion 8*a* is formed on the drive arm 8 so as to correspond to the cam 11 to be rotationally driven around a rotation center C11 and is pushed by the cam 11, and thus the drive arm 8 rotates from an initial corresponding position corresponding to the initial position of the handle body 2 to a pop-up corresponding position corresponding to the pop-up position of the handle body 2 in accordance with rotation of the cam 11.

In order to ensure the contact of the pressed portion 8*a* with the cam 11, a torsion spring 8*b* is mounted around the rotation center C87 between the handle base 7 and the drive arm 8 to bias the drive arm 8 counterclockwise in FIG. 3.

Figure 4B:
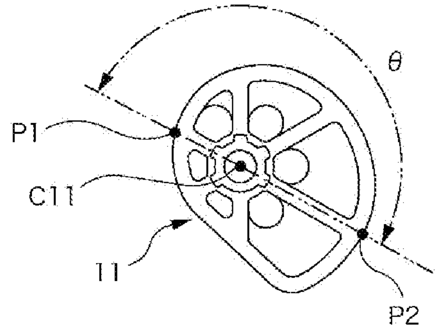
FIG. 4B shows a cam in the drive source of the drive arm.

As shown in FIG. 4B, the cam 11 comes into contact with the pressed portion 8*a* at a start point P1 when the handle body 2 is at the initial position, and rotates counterclockwise by an angle θ about the rotation center C11 in FIG. 4B while maintaining the contact with the pressed portion 8*a*. When the cam 11 comes into contact with the pressed portion 8*a* at an end point P2, the handle body 2 moves to the pop-up position.

Figure 4C:
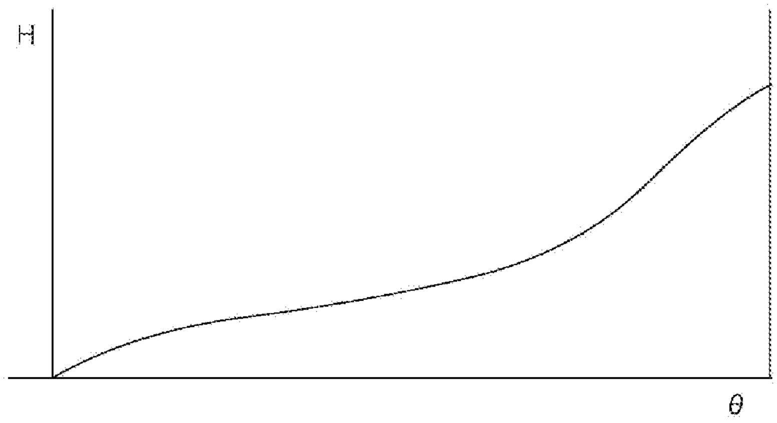
FIG. 4C shows a diagram of the cam in the drive source of the drive arm.
Figure 5A:
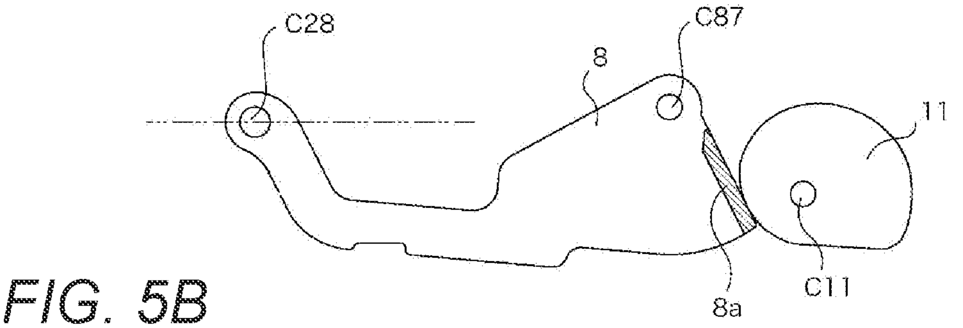
FIG. 5A shows a state in which the drive arm is at an initial corresponding position in an operation of the cam.
Figure 5B:
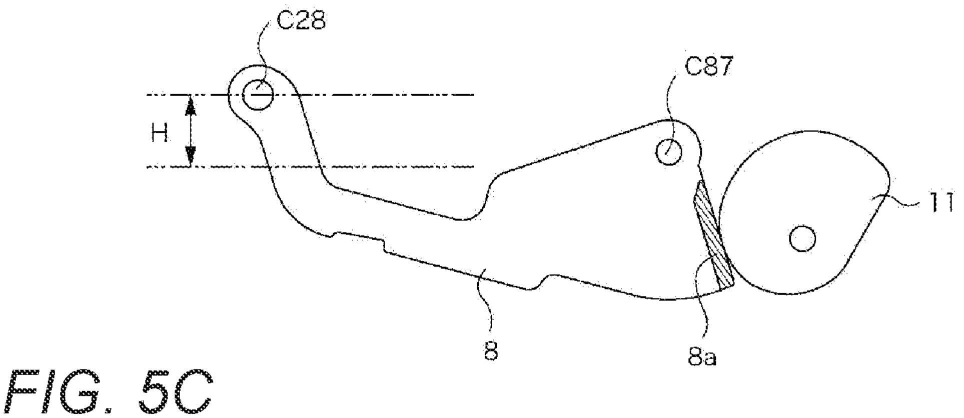
FIG. 5B shows a state between the initial corresponding position and a pop-up corresponding position in the operation of the cam.
Figure 5C:
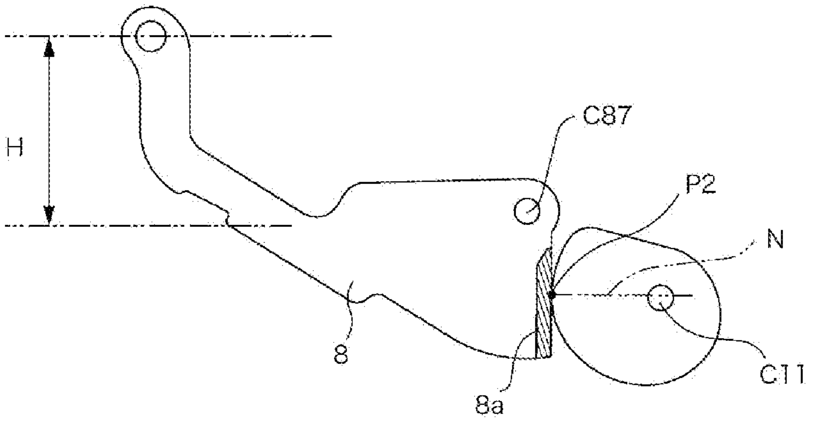
FIG. 5C shows the pop-up corresponding position in the operation of the cam.

FIGS. 5A to 5C are explanatory views showing a state in which the drive arm 8 is operated by the cam 11. FIG. 5A shows a state in which the drive arm 8 is at the initial corresponding position, FIG. 5C shows a state in which the drive arm 8 is at the pop-up corresponding position, and FIG. 5B shows a state in which the drive arm 8 is on the way from the initial corresponding position to the pop-up corresponding position. A reference numeral H shown in FIGS. 5B and 5C denotes a movement amount of a connection point C28 of the drive arm 8 with the handle body 2. FIG. 4C is a cam diagram of the cam 11 for obtaining the movement amount. A horizontal axis represents a rotation angle θ of the cam 11, and a vertical axis represents the movement amount H in a height direction of the connection point with the handle body 2.

As shown in FIG. 4C, the cam 11 is configured such that an increment in a movement distance of the connection point of the drive arm 8 with the handle body 2 in a height direction per unit angle is small in an initial stage of rotation and gradually increases as the cam 11 approaches the end point. Immediately after starting to be driven by the motor, the cam 11 slowly ascends in a vertical direction, and is driven so as to gradually increase an ascending speed as the handle body 2 approaches the pop-up position.

As a result, a driving force is maximized at an initial stage of driving where the ascending speed is low, that is, when the handle body 2 starts to move from the initial position. By virtue of this configuration, for example, even when thin ice is formed around the handle body 2, it is possible to expect a sufficient driving force for crushing the ice and prevent an operation failure due to freezing.

When the handle body returns from the pop-up position to the initial position, since a descending speed decreases in a vicinity of the initial position, it is possible to prevent a collision with the handle base 7, packing, or the like, and it is possible to prevent an occurrence of collision noise, rebound, or the like.

Further, as shown in FIG. 5C, when the drive arm 8 is at the pop-up corresponding position, the rotation center of the cam 11 is disposed in a vicinity of a normal line N drawn down from a contact point P2 with the pressed portion 8*a*. Therefore, a horizontal component when a force from the pressed portion 8*a* is applied to the contact point P2 of the cam 11, that is, a force to rotate the cam 11, is small.

Therefore, even if a load toward the initial position, that is, a force for pushing the handle body 2 is applied to the handle body 2 when the handle body 2 is at the pop-up corresponding position, only a force directed toward the rotation center C11 is generally applied to the cam 11, and a force in a direction perpendicular to the force is small. Therefore, a rotational operation force applied to the cam 11 is small, and a force applied to a worm from a worm wheel can be small.

As shown in FIGS. 3, 6A, and 6B, the handle body 2 is provided with link connection portions 2*a* protruding toward a back-surface side and provided at both front and rear end portions of the handle body, and a handhold recess 2*b* serving as a handhold when the handle body 2 is operated is formed between the front and rear link connection portions 2*a*.

The other end of the drive arm 8, which is connected to the handle base 7 at one end, is rotatably connected to the front link connection portion 2*a* of the handle body 2, and the other end of the operation arm 5 is connected to the rear link connection portion 2*a*.

The connection between the operation arm 5 and the handle body 2 is rotatable and slidable. In this example, a connection pin 12 that is fixed to the rear link connection portion 2*a* and provides a rotation center C27 is inserted into a long hole 5*a* formed in an end portion of the operation arm 5, and thus the rotation center C27, that is, the connection pin 12 is slidable. The connection pin 12 is inserted into the long hole 5*a* and then retained by a retaining member as appropriate.

As shown in FIG. 3, the rotation center C87 of the drive arm 8 with the handle base 7, the rotation center C28 of the drive arm 8 and the handle body 2, the connection pin 12 of the handle body 2, and the rotation center C57 of the operation arm 5 with respect to the handle base 7 are disposed at vertex positions of a parallelogram. The long hole 5*a* has one end position (initial end position) that is a position of the connection pin 12 at the vertex position of the parallelogram, and extends in a rearward and slightly back surface direction, that is, in a direction in which a link length of the operation arm 5 is extended by sliding of the connection pin 12.

As shown in FIG. 3, the operation arm 5 is biased toward the initial corresponding position corresponding to the initial position of the handle body 2 by a torsion spring 5*b* wound around the rotation center C57 of the operation arm 5 with the handle base 7, the torsion spring 8*b* that biases the drive arm 8 toward the initial corresponding position corresponding to the initial position of the handle body 2 is wound around the rotation center C87 of the drive arm 8 with respect to the handle base 7 as described above, and the torsion spring 5*b* biases the connection pin 12 toward the initial end position in the long hole 5*a*, that is, toward the vertex position of the parallelogram and holds the connection pin 12 at the position.

Therefore, in this example, when the electric actuator 1 is driven to rotate the cam 11 counterclockwise in FIG. 3 when the handle body 2 is at the initial position shown in FIG. 3, the drive arm 8 rotates clockwise about the rotation center C87.

As described above, since the operation arm 5 and the handle body 2 are held, by actions of the torsion springs 5*b* and 8*b*, at the initial corresponding position where the connection pin 12 minimizes the link length of the operation arm 5, the drive arm 8, the operation arm 5, the handle body 2, and the handle base 7 form a parallel crank mechanism having the handle base 7 as a fixed link, and the handle body 2 moves from the initial position to the pop-up position shown in FIG. 6A by the rotation of the drive arm 8 while holding a parallel posture.

When the handle body 2 reaches the pop-up position, the drive of the electric actuator 1 is stopped by a switch (not shown), and the handle body 2 is held at the pop-up position. When the electric actuator 1 is reversely driven from this state, the drive arm 8 returns to the initial corresponding position by the torsion spring 8*b* wound around the rotation center C87 and the handle body 2 returns to the initial position.

At the pop-up position, the handle body 2 is held in a posture parallel to the door surface. Thereafter, by pulling out a rear end side of the handle body 2 to an outside of the door, the handle body 2 is rotated about the rotation center C28 with the drive arm 8 until the handle body 2 comes into contact with a stopper (not shown), and as shown in FIG. 6B, the handle body 2 can be moved to a latch release position inclined from the front-end portion toward the rear end portion.

The rotation of the handle body 2 from the pop-up position to the latch release position is performed by a manual rotation operation, and in accordance with the rotation operation of the handle body 2 to the latch release position, the operation arm 5 further rotates beyond the pop-up corresponding position corresponding to the pop-up position of the handle body 2 and rotates to a latch operation corresponding position.

In this example, an operation of the door latch device 4 is performed by operating the latch release lever 3 by the lever push member 6 fixed to the operation arm 5.

Figure 7A:
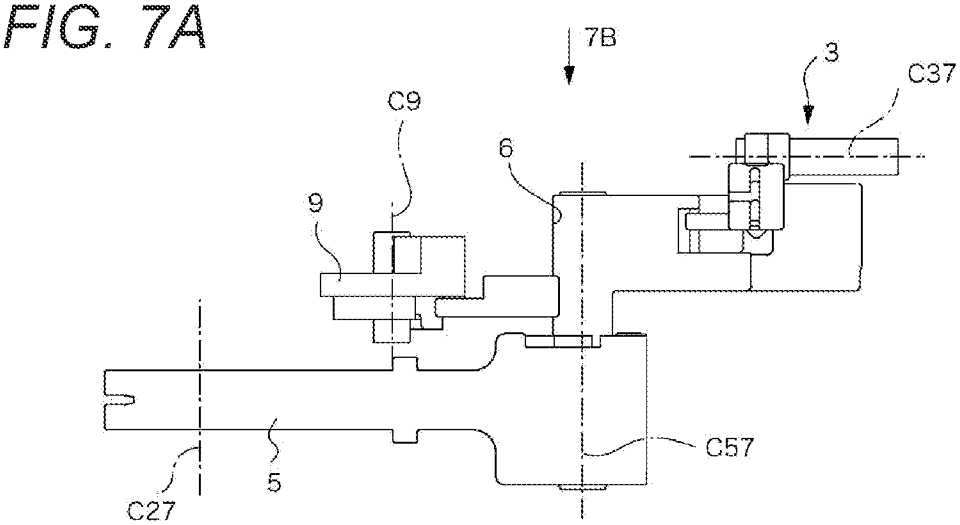
FIG. 7A is an enlarged view of a main part of FIG. 2 in a latch release lever.
Figure 7B:
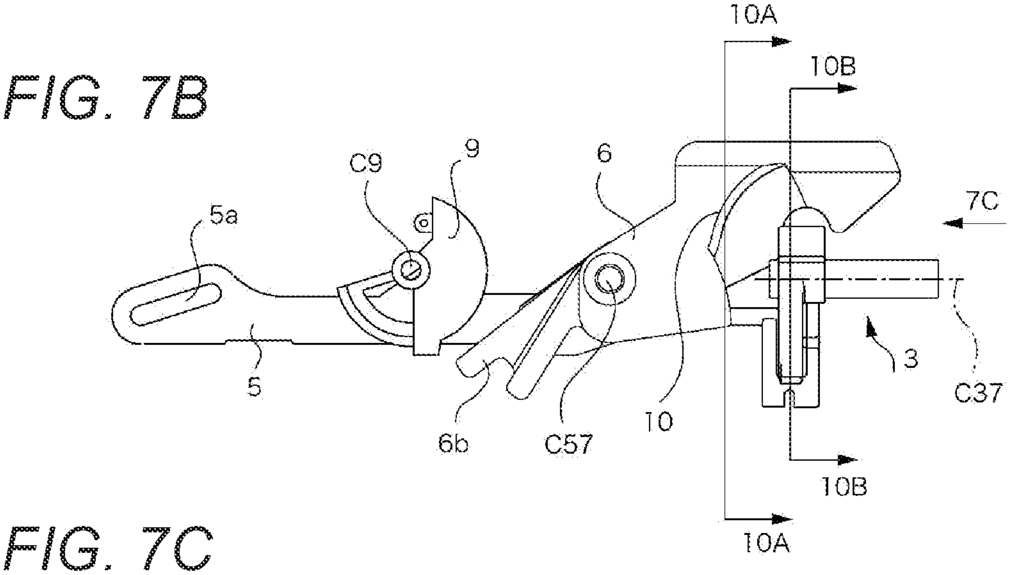
FIG. 7B is a view taken in a direction of an arrow 7B in FIG. 7A.

As shown in FIGS. 7A and 7B, the lever push member 6 is fixed on the rotation center C57 of the operation arm 5 with the handle base 7, and rotates around the rotation center C57 in accordance with the rotation of the operation arm 5.

Figure 8A:
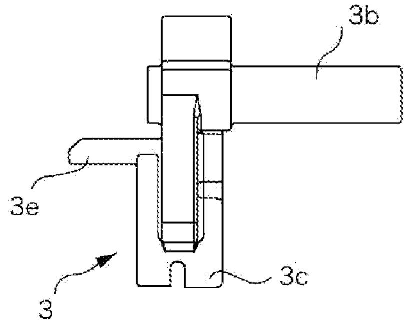
FIG. 8A is a view taken in a direction of an arrow 8A in FIG. 8B.
Figure 8B:
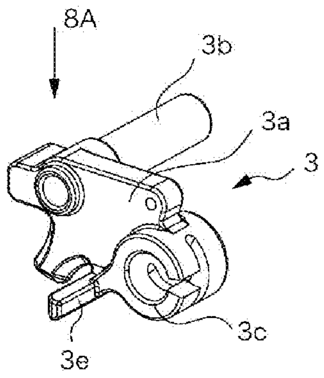
FIG. 8B is a perspective view.

The latch release lever 3 is rotatably connected to the handle base 7 around a rotation center C37 perpendicular to the rotation center C57 of the operation arm 5 with respect to the handle base 7. As shown in FIGS. 8A and 8B, the latch release lever 3 includes a plate-like body portion 3*a*, a cylindrical portion 3*b* through which a rotation shaft is inserted, the cylindrical portion 3*b* protruding from a plate-like body portion 3*a*, and a cable connecting portion 3*c* for holding a tip of an inner cable (not shown) of a cable device 13, the cable connecting portion 3*c* being formed in a vicinity of the cylindrical portion 3*b*.

Figure 7C:
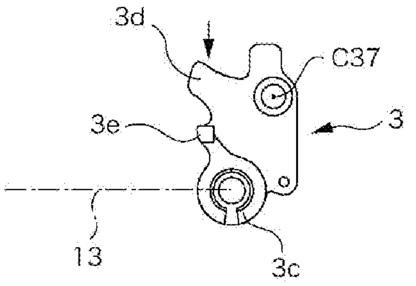
FIG. 7C is a view of the latch release lever as viewed from a direction of an arrow 7C in FIG. 7B.

The latch release lever 3 is biased clockwise in FIG. 7C by a torsion spring (not shown) wound around the rotation center C37, and is held at an initial position shown in FIG. 7C.

Further, the latch release lever 3 includes a pushed portion 3*d*. As will be described later, the pushed portion 3*d* is pushed by a lever push portion 6*a* of the lever push member 6, whereby the latch release lever 3 rotates counterclockwise in FIG. 7C to apply a pulling operation force to the cable device 13 and operate the door latch device 4 (see FIG. 2).

As shown in FIGS. 9A to 9D, the lever push member 6 includes a stopper piece 6*b* at one end portion and a recess 6*c* configured to receive the plate-like body portion 3*a* of the latch release lever 3 at the other end portion, and the lever push portion 6*a* is formed on a peripheral wall portion of the recess 6*c*.

Figure 10A:
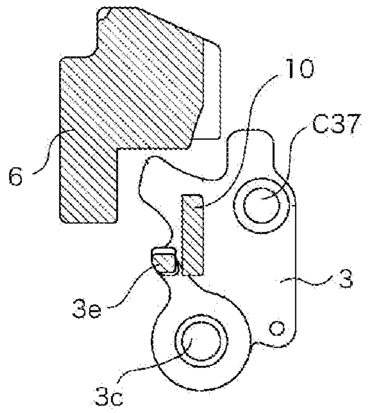
FIG. 10A is a cross-sectional view taken along a line 10A-10A of FIG. 7B.
Figure 10B:
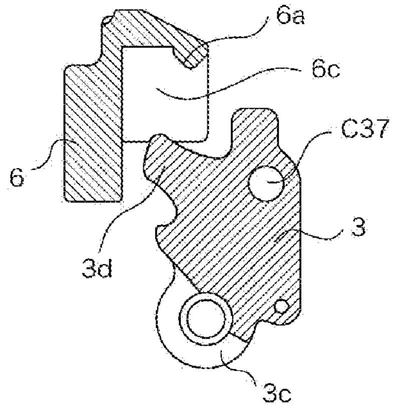
FIG. 10B is a cross-sectional view taken along a line 10B-10B of FIG. 7B.
Figure 10C:
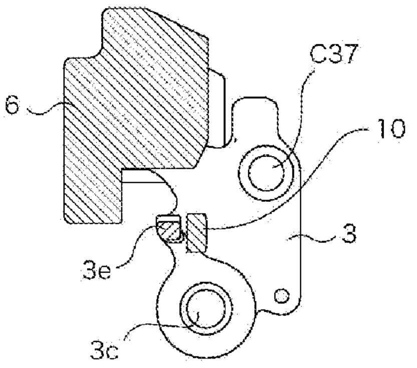
FIG. 10C is a view corresponding to FIG. 10A when an operation arm is at an intermediate position between the initial corresponding position and the pop-up corresponding position.
Figure 10D:
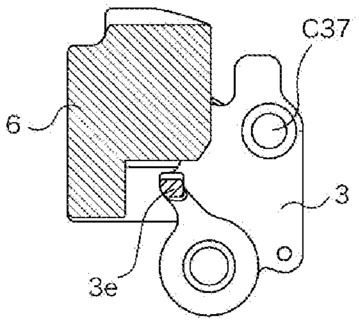
FIG. 10D is a view corresponding to FIG. 10A when the operation arm is at the pop-up correspondence position.
Figure 10E:
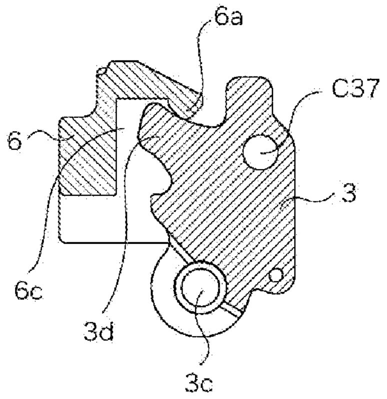
FIG. 10E is a view corresponding to FIG. 10B when the operation arm is at the pop-up correspondence position.

The lever push member 6 moves from a state shown in FIG. 10B to a state shown in FIG. 10E in accordance with the rotation of the operation arm 5 to the pop-up corresponding position, and the lever push portion 6*a* comes into contact with the pushed portion 3*d* of the latch release lever 3. Thereafter, when the handle body 2 is operated to the latch operation position and the operation arm 5 is rotated to an operation corresponding position, the lever push portion 6*a* of the lever push member 6 pushes the pushed portion 3*d* of the latch release lever 3, and the latch release lever 3 rotates around the rotation center C37 to operate the door latch device 4.

Further, a weight portion 6*d* is formed in a vicinity of the lever push portion 6*a* of the lever push member 6 to adjust the moment of inertia of the lever push member 6. A value of the moment of inertia is set to such a magnitude that, when an impact force due to a collision is applied to the vehicle, an operation force generated in the lever push member 6 by inertia and directed toward a direction to operate the latch release lever 3 will be canceled by inertia and the rotation in the direction will not be generated. For example, referring to FIG. 7B, when the handle body 2 and operation arm 5 are in the initial corresponding position and a side collision occurs, the handle body 2 tends to move toward the latch release position in accordance with an inertia force, as the operation arm 5 tends to rotate clockwise around rotation center C57. The operation arm 5 and the lever push member 6 are fixed to each other, so both rotate around C57 in the same direction. However, because the weight member 6*d* of lever push member 6 sets a moment of inertia and therefore tends to rotate counterclockwise around C57, it cancels the inertia force and rotation is not generated. A weight of the weight portion 6*d*, an arm length from the rotation center C57, and the like are determined based on the moment of inertia required for the lever push member 6.

Therefore, in this example, even when a collision impact force is applied, the operation force generated in the lever push member 6 is canceled by the moment of inertia of the lever push member 6, and thus, the latch release lever 3 is not pushed and inadvertent door opening is prevented.

Figure 9A:
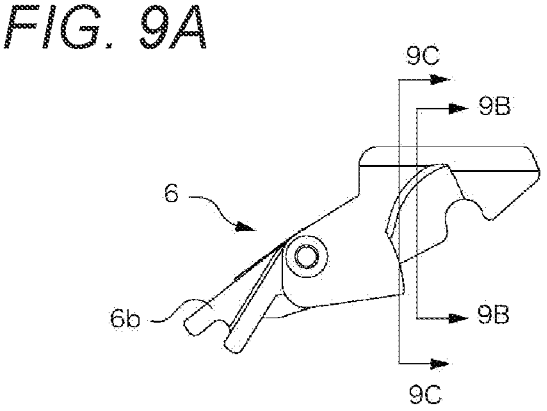
FIG. 9A is a view taken in a direction of an arrow 9A in FIG. 9D showing a lever push member.
Figure 9B:
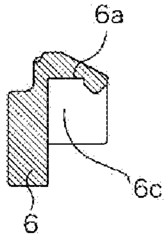
FIG. 9B is a cross-sectional view taken along a line 9B-9B of FIG. 9A.
Figure 9C:
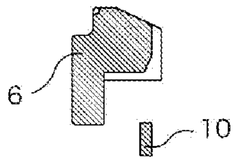
FIG. 9C is a cross-sectional view taken along a line 9C-9C of FIG. 9A.
Figure 9D:
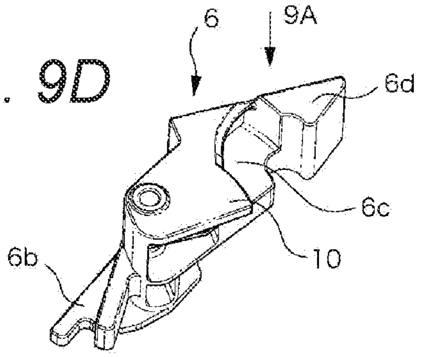
FIG. 9D is a perspective view of the lever push member.

Further, the lever push member 6 is provided with a restriction wall 10, and the latch release lever 3 is provided with a restriction protrusion 3*e*. As shown in FIGS. 8A and 8B, the restriction protrusion 3*e* is erected from the plate-like body portion 3*a*, and the restriction wall 10 is formed as a wall surface of the recess 6*c* as shown in FIG. 9C.

As shown in FIG. 10A, when the lever push member 6 is at the initial corresponding position, the rotation of the latch release lever 3 in the direction toward the latch release position, that is, counterclockwise rotation in FIG. 10A is impossible because the restriction wall 10 blocks a movement path of the restriction protrusion 3*e*, and it is possible to prevent the latch release lever 3 from moving independently to the latch release position due to an impact force such as a collision and from operating the door latch device 4.

The restriction of the rotation of the latch release lever 3 by the restriction wall 10 continues even at an intermediate position between the initial corresponding position and the pop-up corresponding position of the lever push member 6 as shown in FIG. 10C, and is eliminated when the lever push member 6 reaches the pop-up corresponding position as shown in FIG. 10D. Thereafter, the latch release lever 3 can be rotated by pushing the pushed portion 3*d* by the lever push portion 6*a* of the lever push member 6.

Figure 2:
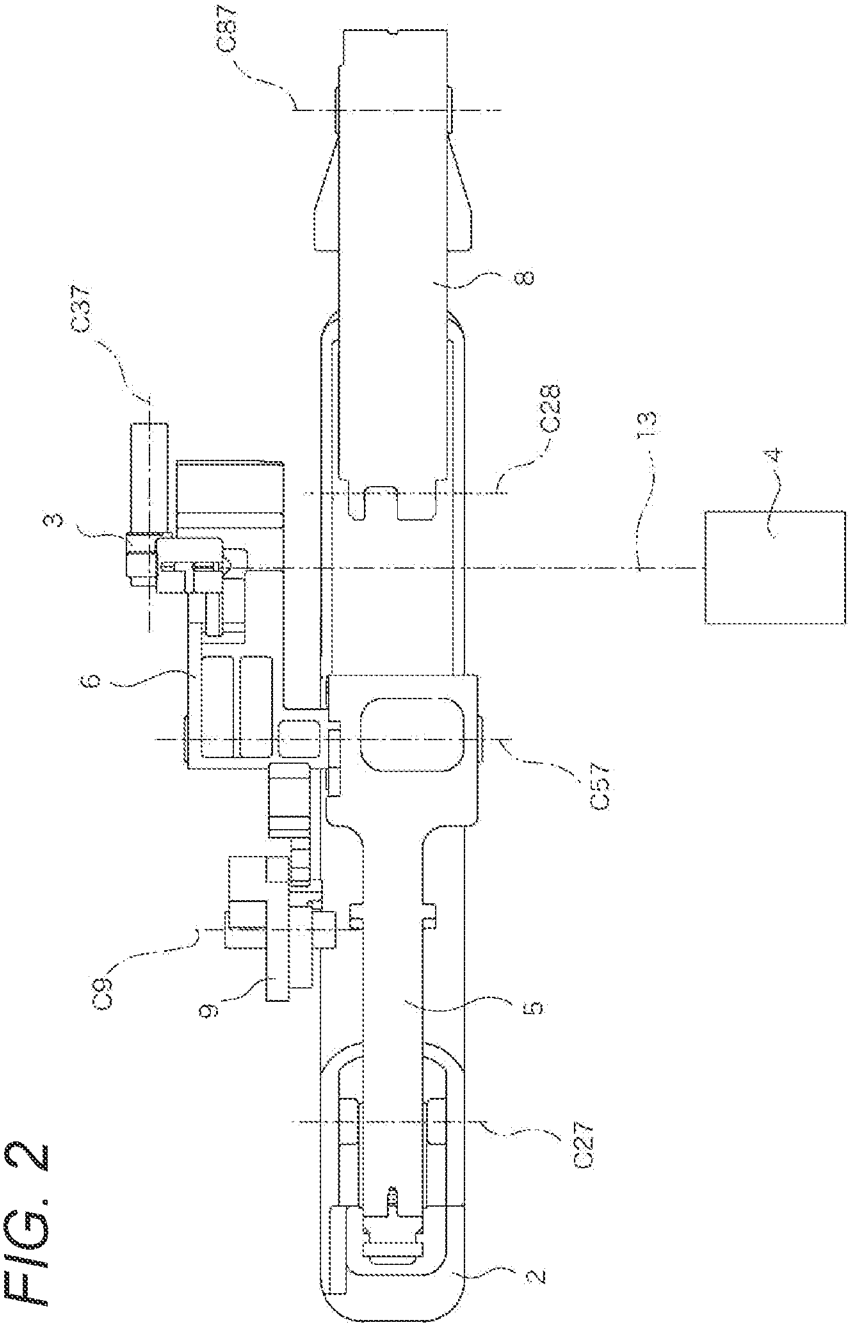
FIG. 2 is a rear view of the handle device.

Further, an inertia stopper 9 for restricting the movement of the lever push member 6 when a collision load is applied to the vehicle is incorporated in the handle device. The inertia stopper 9 is rotatably connected to the handle base 7, and rotates around a rotation center C9 (as shown in FIGS. 2 and 7A) independently of the operation arm 5. The inertia stopper 9 rotates between a standby rotation position shown in FIG. 11A and a stop position shown in FIG. 11B, and is biased toward the standby rotation position by a torsion spring (not shown) wound around the rotation center C9.

Figure 11A:
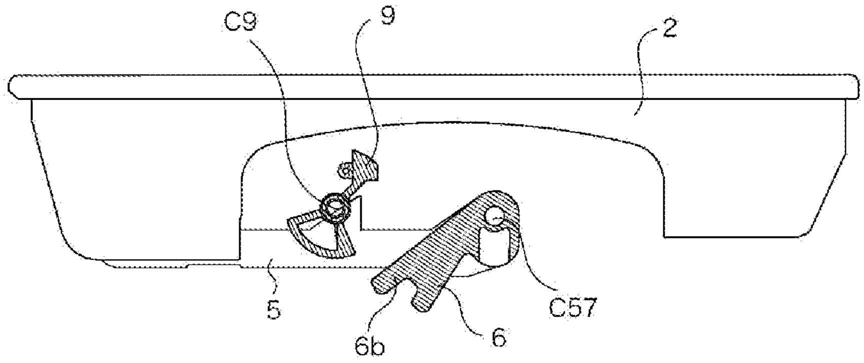
FIG. 11A shows a non-operating state in an operation of an inertia stopper.

The inertia stopper 9 is formed as a cylindrical body whose gravity center position is set so as to move from the standby rotation position to the stop position by inertia when a collision force due to a collision is applied. As shown in FIG. 11A, since a movement path (clockwise rotation around the rotation center C57 in FIG. 11A) of the stopper piece 6*b* of the lever push member 6 is opened at the standby rotation position, the rotation following an rotation operation of the operation arm 5 to the latch operation corresponding position is allowed.

Figure 11B:
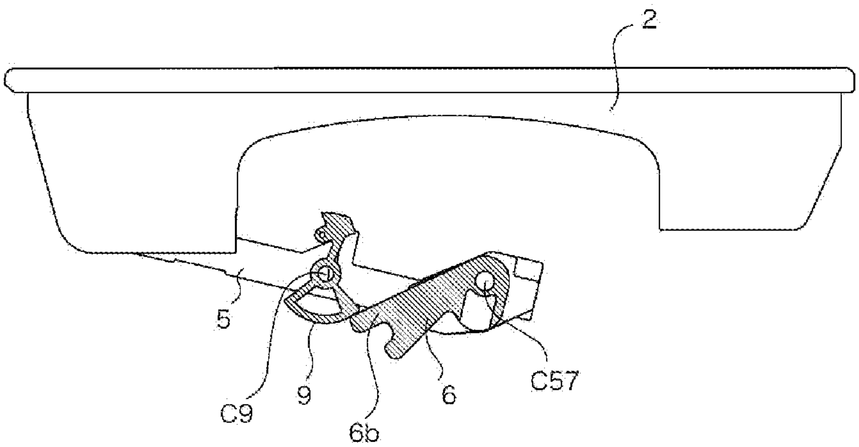
FIG. 11B shows a state in which the inertia stopper is rotated to a stopper rotated position by an impact load in the operation of the inertia stopper.

On the other hand, when a collision force from a side of the vehicle is applied to the vehicle, the inertia stopper 9 rotates from the standby rotation position to the stop position. As shown in FIG. 11B, when the inertia stopper 9 is at the stop position, the inertia stopper 9 blocks the movement path of the stopper piece 6*b* of the lever push member 6, and thus the lever push member 6 stays at an interference position with the inertia stopper 9 without following the rotation of the operating arm 5. Therefore, it is possible to reliably prevent the latch release lever 3 from operating and the door from being opened unnecessarily.

What is claimed is:

1. A handle device for a vehicle, comprising:

a handle body;

a latch release lever;

a door latch device configured to be provided in a door of the vehicle;

an electric actuator; and a lever push member, wherein the handle body is configured to be driven from an initial position to a pop-up position by the electric actuator and is manually operated further to a latch operation position beyond the pop-up position, wherein the door latch device is configured such that a latch of the door latch device is released by the latch release lever rotating to a latch release position, wherein the lever push member is configured to rotate around a rotation center from an initial corresponding position and has a lever push portion to push the latch release lever toward the latch release position in accordance with an operation of the handle body, the initial corresponding position corresponding to the initial position of the handle body, and wherein the lever push member has a weight member disposed proximal the lever push portion at an arm length from the rotation center to set a moment of inertia of the lever push member to cancel an inertia force generated when a collision impact load is applied to the vehicle, which inertia force tends to move the lever push member toward the latch release position.

2. The handle device according to claim 1, further comprising:

a handle base;

a drive arm; and an operation arm, wherein the drive arm is configured such that one end of the drive arm is rotatably connected to one end of the handle body, the other end of the drive arm is rotatably connected to the handle base, and the drive arm is driven by the electric actuator, wherein the operation arm forms a link mechanism together with the handle body and the drive arm, and wherein one end of the operation arm is connected to the other end of the handle body, and the other end of the operation arm is rotatably connected to the handle base, and the lever push member is integrally formed with the operation arm.

3. The handle device according to claim 2, wherein a connection portion between the operation arm and the handle body has a sliding pair comprising an elongated slot and a pin slidingly engaged with the slot, and wherein the handle body is configured to move from the pop-up position to the latch operation position by a rotation operation of the handle body about a rotation center of the handle body with respect to the drive arm.

4. The handle device according to claim 1, further comprising:

an inertia stopper, wherein the inertia stopper is configured to, when the collision impact load is applied, rotate to a stop position and prevent the lever push member from pushing the latch release lever toward the latch release position.

5. The handle device according to claim 1, wherein the lever push member has a restriction wall, and wherein the restriction wall prevents the latch release lever from moving to the latch release position when the handle body is located at a position between the initial position and the pop-up position, and allows the latch release lever to move to the latch release position when the handle body is located at the latch operation position.

* * * * *